W. H. HAMMOND.
Pipe-Joint.
No. 128,303. Patented June 25, 1872.
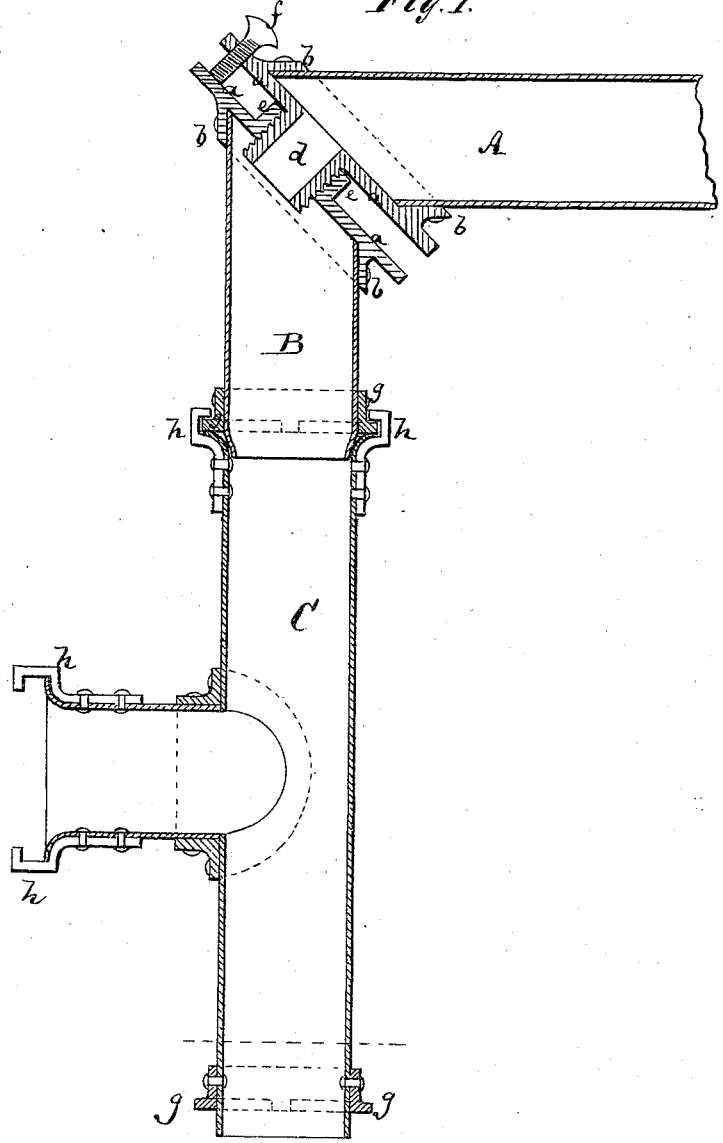
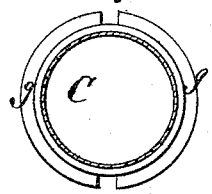
Witnesses:
E. Wolff
W. A. Graham
Inventor:
W. H. Hammond
per Munn & Co.
Attorneys.

UNITED STATES PATENT OFFICE.

WILLIAM H. HAMMOND, OF TIPTON, IOWA.

IMPROVEMENT IN PIPE-JOINTS.

Specification forming part of Letters Patent No. 128,303, dated June 25, 1872.

Specification describing a new and Improved Pipe-Joint, invented by WILLIAM HENRY HAMMOND, of Tipton, in the county of Cedar and State of Iowa.

This invention relates to a new manner of coupling stove, water, and other pipes at angles or in straight lines; and has for its object to facilitate the process of coupling, and insure firm and reliable connections of the sections of the pipe.

In the accompanying drawing, Figure 1 represents a longitudinal section of several sections of pipe connected on my improved plan. Fig. 2 is a transverse section of the same.

Similar letters of reference indicate corresponding parts.

A B in the drawing are two sections of stove-pipe to be joined at right angles. To the end of each section is secured a metal plate, $a$, flanged as at $b$, and made to fit over the regular pipe, to which it is riveted, as shown. The plate $a$ on the section A has a tubular projection, $d$, with a male screw-thread cut on it fitting the female screw-thread in a tubular projection, $e$, of the opposite section, as shown. In this manner the two sections are properly and firmly united, the threads fitting sufficiently tight to prevent the escape of smoke or water. A screw, $f$, may be fitted through one of the plates $a$ to bear against the other, and thereby to confine the parts in any one desired position. For joining the section B in a straight line to a section, C, of pipe, a flanged ring, $g$, is riveted to the end of one of the sections, with two notches in the flange, as shown in Fig. 2. The opposite section has two hooks, $h$ $h$, riveted to it, which, entering through the notches of the flange $g$, can be turned to overlap the flange and thus to hold the parts properly connected. This latter joint can also be formed on elbows, as indicated in Fig. 1.

Having thus described my invention, I claim as new and desire to secure by Letters Patent—

1. The tubular screws $d$ and $e$ applied to the plates $a$ $a$ of pipe sections, to join the same at a right angle, as set forth.

2. The set-screw $f$, arranged in combination with the plates $a$ $a$ and tubular projections $d$ $e$, substantially as and for the purpose herein shown and described.

WILLIAM HENRY HAMMOND.

Witnesses:
WM. ELLIOTT,
W. P. WOLF.